United States Patent
Isgar (10) Patent No.: US 12,219,472 B2
(45) Date of Patent: *Feb. 4, 2025

(54) WIFI SHARING SYSTEM WITH MESH NETWORK FUNCTIONALITY

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 302 days.

This patent is subject to a terminal disclaimer.

(21) Appl. No.: 17/935,991

(22) Filed: Sep. 28, 2022

(65) Prior Publication Data

US 2023/0015808 A1 Jan. 19, 2023

Related U.S. Application Data

(63) Continuation of application No. 16/998,347, filed on Aug. 20, 2020, now Pat. No. 11,461,752.

(Continued)

(51) Int. Cl.
| | |
|---|---|
| *H04L 9/40* | (2022.01) |
| *G06Q 20/12* | (2012.01) |
| *G06Q 20/14* | (2012.01) |
| *G06Q 20/32* | (2012.01) |
| *G06Q 20/40* | (2012.01) |
| *G06Q 30/0645* | (2023.01) |
| *H04W 4/80* | (2018.01) |

(Continued)

(52) U.S. Cl.
CPC .......... *H04W 48/18* (2013.01); *G06Q 20/127* (2013.01); *G06Q 20/145* (2013.01);
(Continued)

(58) Field of Classification Search
CPC .. G06Q 20/127; G06Q 20/145; G06Q 20/325; G06Q 20/401; G06Q 30/0185;
(Continued)

(56) References Cited

U.S. PATENT DOCUMENTS

| | | |
|---|---|---|
| 9,078,137 B1 | 7/2015 | Chechani et al. |
| 10,395,257 B2 | 8/2019 | Patterson et al. |

(Continued)

FOREIGN PATENT DOCUMENTS

| | | | | |
|---|---|---|---|---|
| CN | 109618316 A | * | 4/2019 | ............ H04W 12/04 |
| WO | 2020074003 | | 4/2020 | |
| WO | WO-2020074003 A1 | * | 4/2020 | ............ H04W 48/02 |

OTHER PUBLICATIONS

Isgar, Charles, WiFi Sharing System and WiFi Sharing System With Mesh Network Functionality, Patent Cooperation Treaty Application Serial No. PCT/US21/46905, filed on Aug. 20, 2021, International Search Report dated Dec. 8, 2021.

(Continued)

*Primary Examiner* — Mohammad A. Nilforoush
*Assistant Examiner* — Wodajo Getachew
(74) *Attorney, Agent, or Firm* — Schmeiser, Olsen & Watts LLP (57) ABSTRACT

Described is a secure WiFi sharing system for use between neighbors or others in like proximity. The system may include a WiFi signal with an established network connection and a user computing device seeking to access the network connection through the WiFi signal. The system allows the user computing device to rent or share the WiFi signal through the system and establish a secure connection between the user computing device and the WiFi network without the need of sharing the SSID and/or the password. Further, the system automatically changes a user computing device to another WiFi signal on the system and in proximity if the signal strength of the connected WiFi signal drops below a minimum threshold.

15 Claims, 7 Drawing Sheets

Related U.S. Application Data (60) Provisional application No. 62/891,201, filed on Aug. 23, 2019.

(51) Int. Cl.
| | |
|---|---|
| *H04W 12/033* | (2021.01) |
| *H04W 12/08* | (2021.01) |
| *H04W 48/16* | (2009.01) |
| *H04W 48/18* | (2009.01) |
| *H04W 84/12* | (2009.01) |
| *G06Q 30/018* | (2023.01) |
| *H04W 12/06* | (2021.01) |
| *H04W 12/50* | (2021.01) |

(52) U.S. Cl.
CPC ....... *G06Q 20/3224* (2013.01); *G06Q 20/325* (2013.01); *G06Q 30/0645* (2013.01); *H04L 63/083* (2013.01); *H04W 12/033* (2021.01); *H04W 12/08* (2013.01); *H04W 48/16* (2013.01); *H04W 84/12* (2013.01); *G06Q 20/401* (2013.01); *G06Q 30/0185* (2013.01); *G06Q 2220/00* (2013.01); *H04W 4/80* (2018.02); *H04W 12/06* (2013.01); *H04W 12/50* (2021.01)

(58) Field of Classification Search
CPC .......... G06Q 30/0645; G06Q 2220/00; H04W 12/03; H04W 12/08; H04W 48/18; H04W 84/12; H04L 63/083
USPC .......................................................... 705/75
See application file for complete search history.

(56) References Cited

U.S. PATENT DOCUMENTS

| | | | |
|---|---|---|---|
| 10,827,227 B2 | 11/2020 | Thomas et al. | |
| 10,832,294 B1 | 11/2020 | Bentley et al. | |
| 2006/0046709 A1* | 3/2006 | Krumm ................ | H04W 64/00 455/422.1 |
| 2008/0051130 A1 | 2/2008 | Juneja et al. | |
| 2012/0003976 A1 | 1/2012 | Bhat et al. | |
| 2012/0110640 A1* | 5/2012 | Donelson .............. | H04L 63/102 726/3 |
| 2013/0094423 A1 | 4/2013 | Wengrovitz et al. | |
| 2014/0016569 A1 | 1/2014 | Chen et al. | |
| 2014/0373123 A1 | 12/2014 | Kang | |
| 2015/0063230 A1 | 3/2015 | Feng | |
| 2015/0124791 A1* | 5/2015 | Mazandarany ....... | H04W 12/04 370/338 |
| 2015/0148104 A1* | 5/2015 | Friedl ................... | H04W 12/06 455/561 |
| 2016/0066227 A1* | 3/2016 | Townend .............. | H04W 76/10 370/331 |
| 2016/0095017 A1* | 3/2016 | Ely ....................... | H04W 16/14 455/454 |
| 2016/0105846 A1 | 4/2016 | Anderson et al. | |
| 2016/0262082 A1 | 9/2016 | Flynn et al. | |
| 2017/0034703 A1 | 2/2017 | Dimatteo et al. | |
| 2018/0035291 A1 | 2/2018 | Dowlatkhah et al. | |
| 2018/0198883 A1 | 7/2018 | Vuomos et al. | |
| 2018/0332630 A1 | 11/2018 | Gorajal | |
| 2018/0343609 A1* | 11/2018 | Gu ........................ | H04W 48/20 |
| 2019/0026793 A1 | 1/2019 | Rollon | |
| 2019/0041963 A1 | 2/2019 | Singh et al. | |
| 2019/0141624 A1* | 5/2019 | Wong .................... | H04W 48/18 |
| 2019/0313312 A1 | 10/2019 | Gupta et al. | |
| 2020/0092797 A1* | 3/2020 | Gustafson ............. | H04W 48/14 |
| 2021/0056524 A1 | 2/2021 | Isgar | |
| 2021/0058787 A1 | 2/2021 | Isgar | |
| 2021/0243603 A1 | 8/2021 | Yin et al. | |

OTHER PUBLICATIONS

Sen et al., Incentivizing Time-Shifting of Data: A Survey of Time-Dependent Pricing for Internet Access, IEEE Communications Magazine, Nov. 2012.

* cited by examiner

WIFI SHARING SYSTEM WITH MESH NETWORK FUNCTIONALITY

CROSS REFERENCE TO RELATED APPLICATION

This application is a continuation of U.S. patent application entitled "WIFI SHARING SYSTEM WITH MESH NETWORK FUNCTIONALITY," Ser. No. 16/998,347, filed on Aug. 8, 2020, which claims priority to U.S. Provisional Patent Application entitled "WIFI SHARING SYSTEM WITH MESH NETWORK FUNCTIONALITY," Ser. No. 62891201, filed Aug. 23, 2019, the disclosures of which are hereby incorporated entirely herein by reference.

BACKGROUND OF THE INVENTION

Technical Field

This invention generally relates to a WiFi system, and more specifically to a WiFi sharing system for sharing a secure WiFi signal or signals in a mesh-type network manner with others within the same proximity, such as a neighborhood or the like in an organized manner allowing for payment or revenue to be credited to owners of existing WiFi signals by others to use the WiFi signals.

State of the Art

There are ways that individuals can share hotspots or share WiFi signals from phones or by giving other users your SSID and password to join your WiFi network. However, there is not an available system that allows user to share a WiFi signal with others around them without sharing the SSID, the password or a combination thereof. Further, there is not a system that allows a user to pay for use of a WiFi signal from others around them.

Accordingly, what is needed is an organized secure system for sharing existing WiFi signals between an individual seeking to rent and/or share another individual's existing WiFi signal.

SUMMARY OF THE INVENTION

An embodiment includes a WiFi sharing system comprising: a server having a memory storing personal property information; a provider computing device coupled to the server; and a user computing device coupled to the provider computing device, wherein the server is programmed to: receive and process a signal from a provider computing device that a WiFi network associated with the provider computing device is in a share WiFi mode; automatically set the WiFi network to share WiFi mode; receive and process a signal from a user computing device that the user computing device is requesting to rent access to a WiFi network, wherein the request includes location data of the user computing device; determine that the WiFi network in the share WiFi mode is within WiFi proximity of the user computing device and send the name of the WiFi network to the user computing device for display and selection through the user computing device; receive and process a signal from the user computing device selecting the WiFi network; process payment for use of the WiFi network and automatically establish a connection between the user computing device and the WiFi network without sharing the SSID, the password or a combination of the SSID and the password.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to a WiFi sharing system for sharing a secure WiFi signal with others within the same proximity. The system is a formalized system that allows neighbors to share WiFi signals, with each other and effect payment from one neighbor as rent for the WiFi signal use to the neighbor providing the source of WiFi signal and Internet connection. It establishes an organized system with a set of rules of expectation of each party. The system may include the use of a software application, a web application or a mobile application operating on a user computing device and a provider computing device that may be a mobile computing device like a smartphone, a tablet, a wearable, a laptop, a desktop computer and the like.

Figure 1:
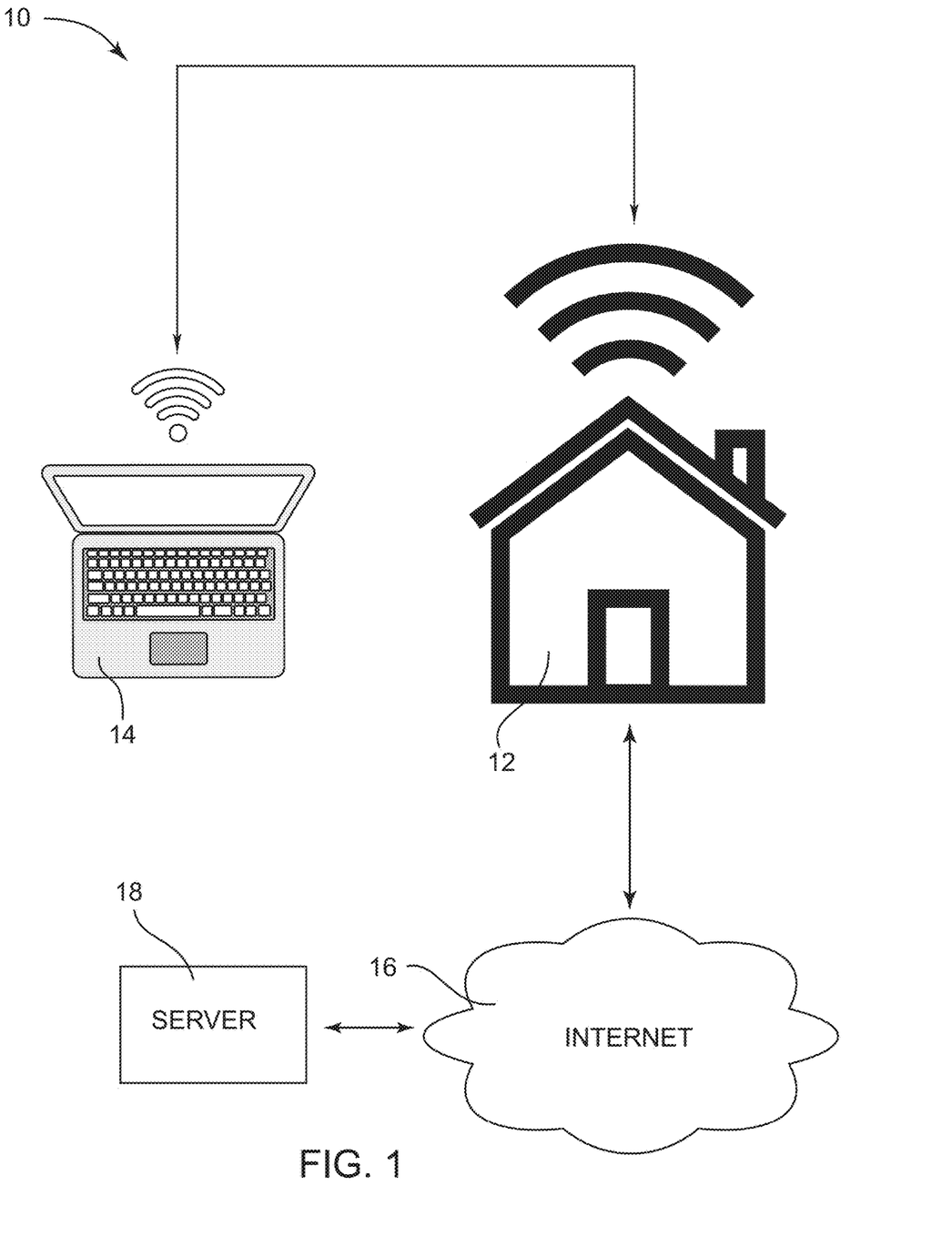
FIG. 1 a view of a WiFi sharing system according to an embodiment.

FIG. 1 depicts a WiFi sharing system 10 in accordance with an embodiment of the invention. The system 10 includes a WiFi source 12, a user computing device 14, the Internet 16 and a server 18. In broad operation, the WiFi source 12 is placed in a share WiFi mode and allows the user computing device 14 to rent usage of the WiFi source 12 to connect to the Internet 16. The server 16 operates to establish the connection and transaction of the rental of usage of the WiFi signal of the WiFi source 12.

Figure 2:
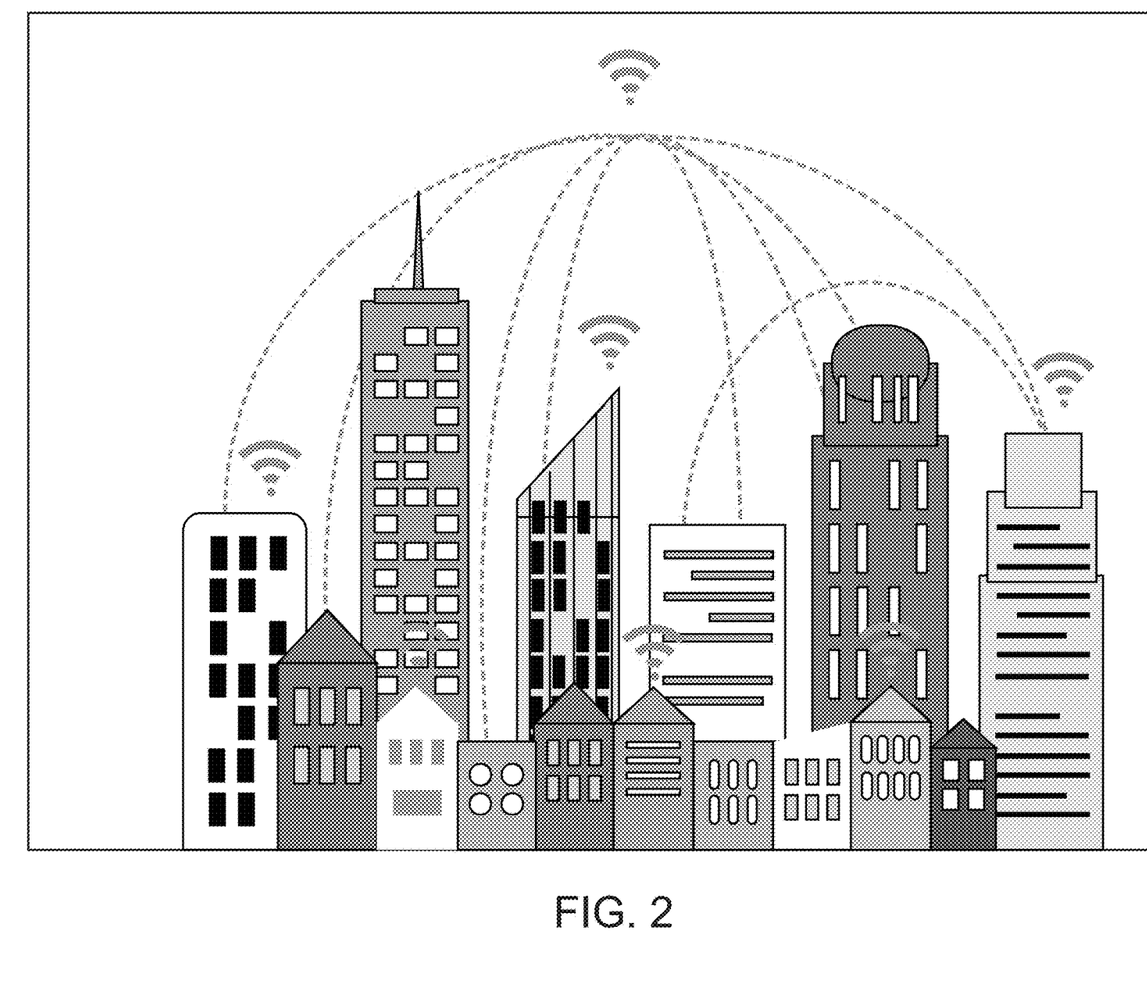
FIG. 2 is a view of various individuals utilizing a WiFi sharing system according to an embodiment.

FIG. 2 depicts an urban setting with several users that are sharing WiFi signals in accordance with embodiments of the system. The operation of the system 10 establishes an anonymous platform for neighbors to share a WiFi signal to access the Internet. In this embodiment, users of the system may establish a master lease agreement with established payment structure in order ensure that the user always has a WiFi connection with a minimum signal strength. In order to accomplish this, the system 10 may allow a user, as shown in FIG. 2, to establish a connection with one shared WiFi signal, however, if there is a stronger signal or the established connected signal drops below an established minimum signal strength, the user computing device 14 of that user can be automatically switched to connection of another shared WiFi signal without the need for reconnecting. In at least this way, all signals within a WiFi proximity of the user computing device 12 of that user can operate as a mesh WiFi network, ensuring that the user computing device 12 may always have proper signal strength. In these embodiments, the system 10 accounts for the amount of time and/or the amount of data the user computing device 14 uses when connected to each shared WiFi network of the system and apportions out payment from the user to each of the networks based on the tracked amount of time and/or amount of data used on each shared WiFi network.

It will be understood that the operation of the system 10 is accomplished with security and privacy protocols as a consideration. The sharing of the WiFi signal includes security and encryption technology (such as, but not limited to, virtual private network ("VPN") technology) to prevent all users sharing a WiFi connection from viewing files and communications and the like from any of the other users. Further, the provider's personal network and computers coupled thereto are protected from access by other renting the WiFi signal. This allows for the renting of and sharing of WiFi connections without compromising the security of the provider and the user. This system will have standard and consistent security protocols that the user and the provider can both have confidence in.

Figure 3:
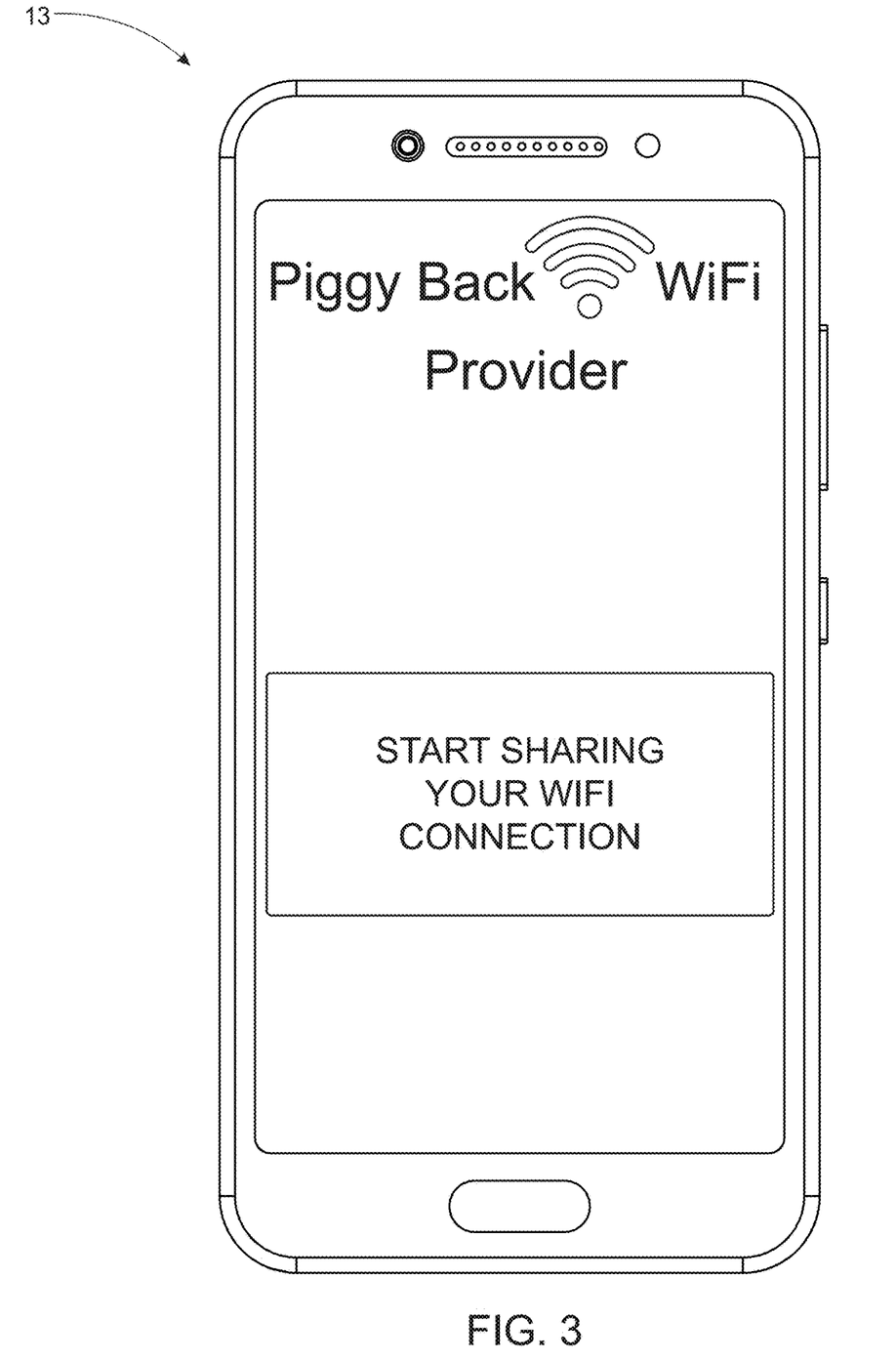
FIG. 3 is a user interface for interaction with a WiFi sharing system according to an embodiment.
Figure 4:
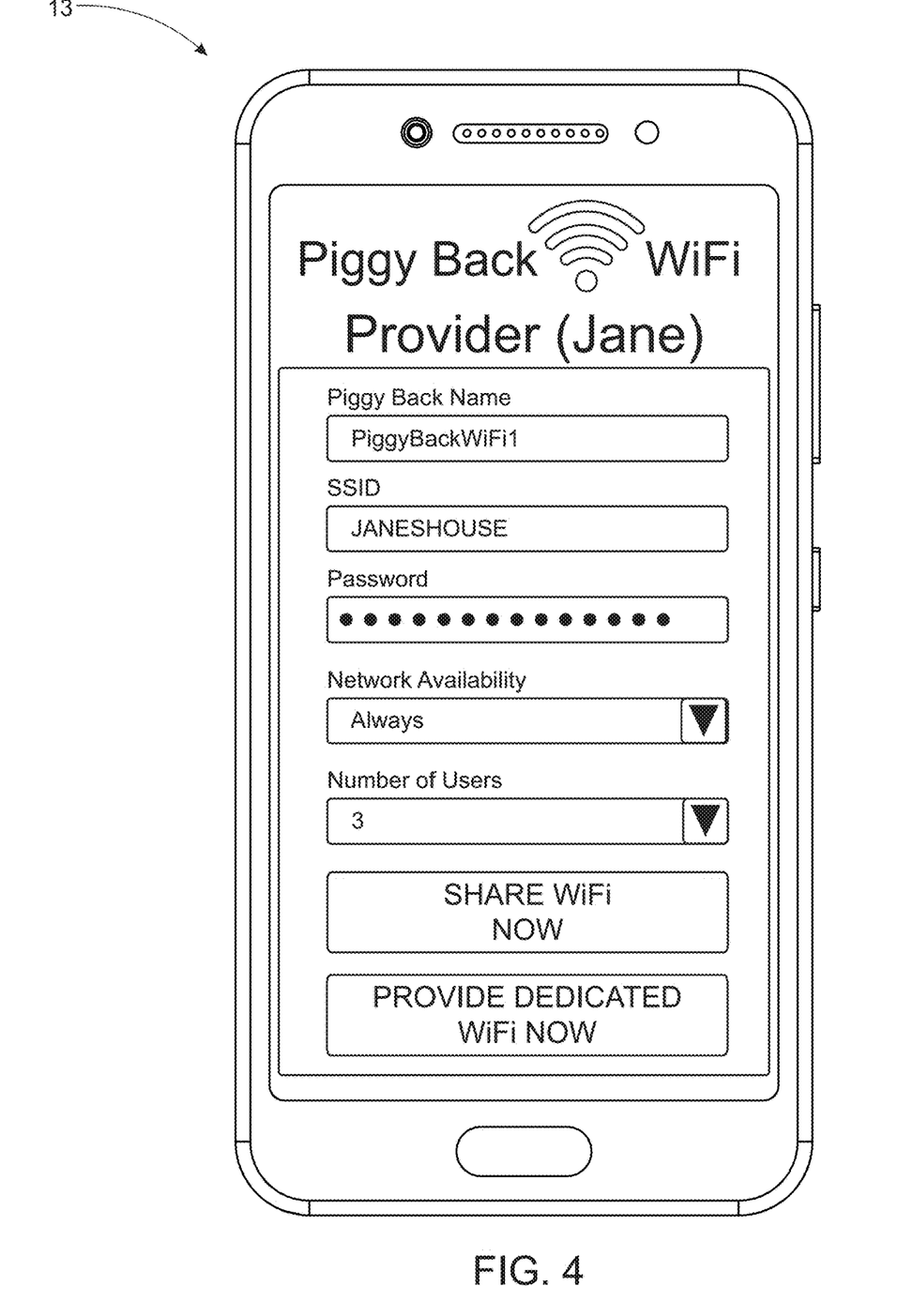
FIG. 4 is a user interface for interaction with a WiFi sharing system for a user that seeks to make a WiFi signal available according to an embodiment.

The WiFi source 12 may include a provider computing device 13 coupled to the WiFi source 12. The provider computing device 13 may connect to the server 18 through the WiFi source 12. A user interface, as shown in FIG. 3, either through an application or a web application may present the provider an option to "Start Sharing Your WiFi Connection" or the equivalents thereto. The provider computing device 13 would select the "Start Sharing Your WiFi Connection" button. In so doing, the provider computing device 13 will display another user interface to enter or confirm WiFi network settings as shown in FIG. 4. The user making the WiFi network available may be prompted to enter or confirm certain information, such as, but not limited to, Network Name utilized on the shared WiFi system 10, SSID, Password, Network Availability (such as time of day, number of days and the like), number of users that can share (updated as users rent access to the WiFi signal), and the like. Once the information is entered, the user may select the "Share WiFi Now" button to share it with multiple users, select the "Provide Dedicated WiFi Now" button to provide a dedicated connection to a single user or a button equivalent to these two buttons. This sends a signal to the server 18 that the WiFi source 12 is being shared and the server 18 can place the WiFi network in a share WiFi mode under the selected type of sharing. The share WiFi mode makes the WiFi network visible on the system 10.

Figure 5A:
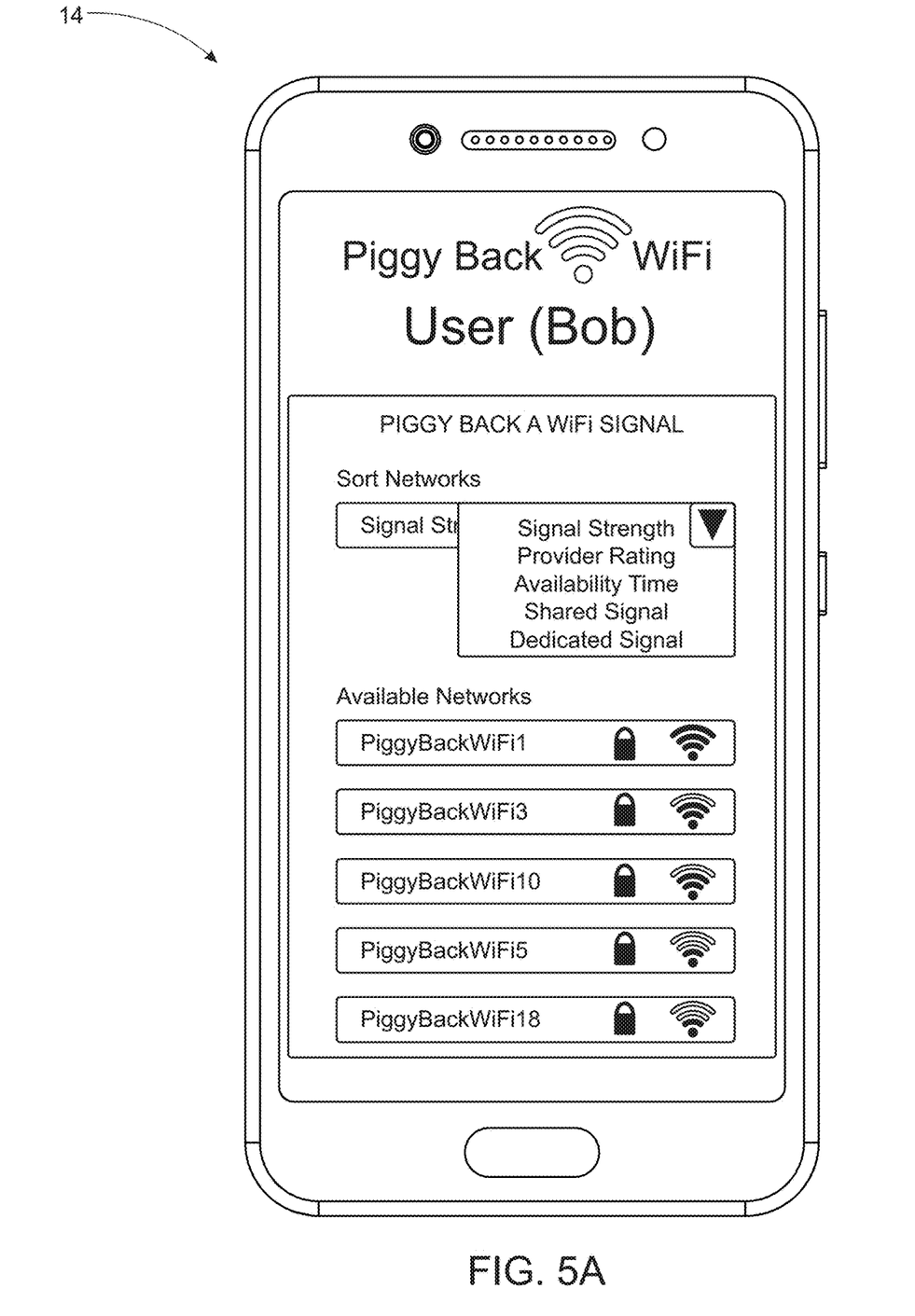
FIG. 5A is a user interface for interaction with a WiFi sharing system for a user that seeks to rent a WiFi signal according to an embodiment.
Figure 6:
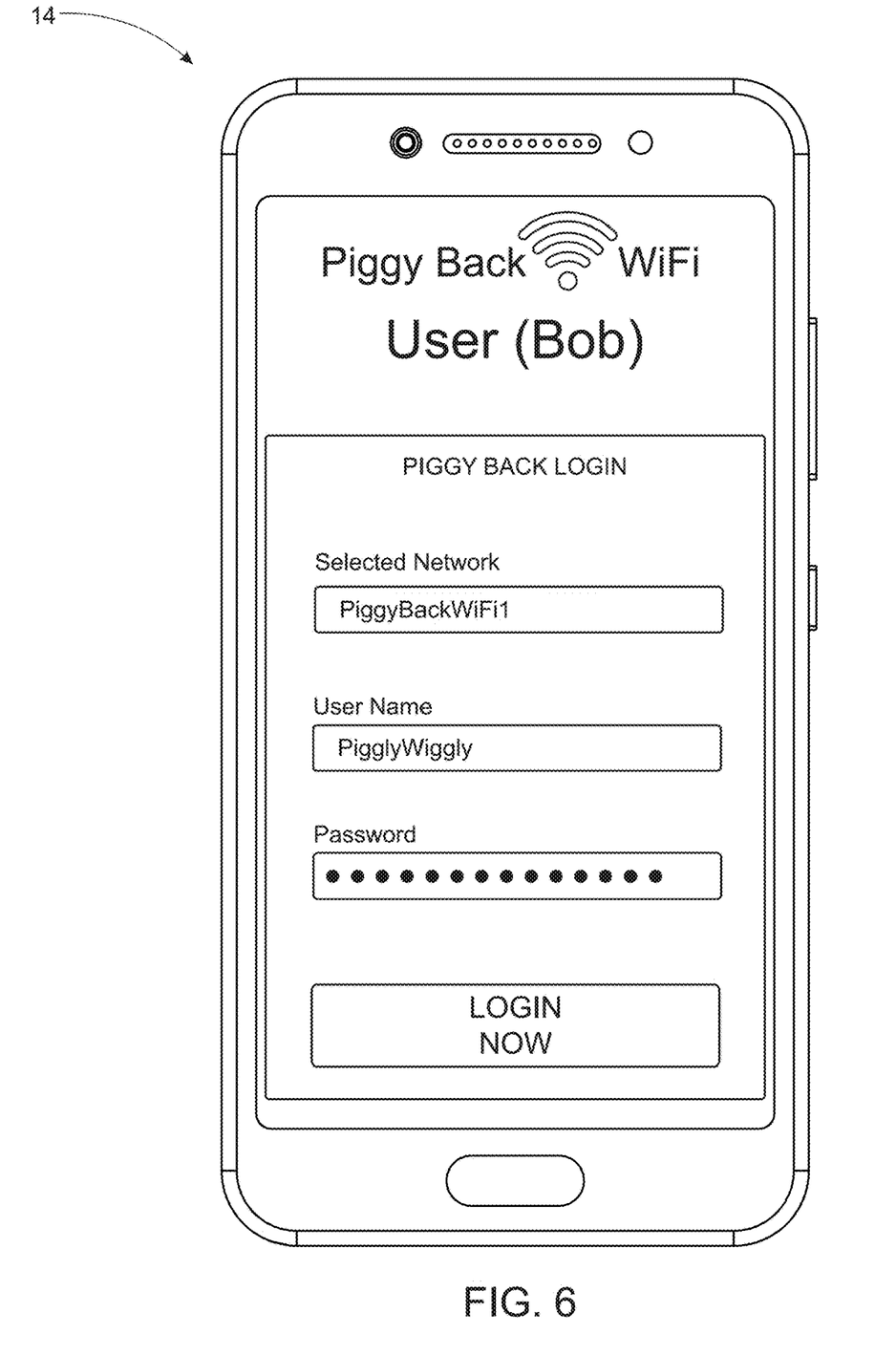
FIG. 6 is a user interface for interaction with a WiFi sharing system for logging into the system to establish a connection with the shared WiFi signal according to an embodiment.

A user computing device 14 that accesses the system by operating an application or a web application may be presented the user interface of FIG. 5A to "Piggy Back A WiFi Signal." Various WiFi networks on the system 10 that are in the share WiFi mode are displayed. The system only displays the WiFi networks that are also within WiFi proximity of the user computing device 14, wherein WiFi proximity means that a WiFi signal can be detected. The user computing device 14 may sort the available WiFi networks be certain filters, such as, but not limited to signal strength, provider rating, availability time, shared signal, dedicated signal and the like. The user may select the WiFi network she wishes to join by selecting the button with the WiFi network name the user wishes to rent from. The selection of the WiFi network to join results in the display of the user interface for login depicted in FIG. 6. The user is prompted to enter or confirm the User Name and password of the user to access the system 10. The selection of a button, such as "Login Now" shown in FIG. 6 may be selected to send the login information to the server 18 through the WiFi Network connection. This is done with encryption and without having to send the information through the provider computing device, but strictly through a limited connection between the user computing device and the WiFi network. The server 18 confirms the user name and password, and the confirmation of the user name and password institutes the full connection to the WiFi network. Confirmation of the user name and password includes confirming that there is an active payment instrument saved and available to pay for the time using the system. In some embodiments, the connection may be automatically established after payment for renting use of the WiFi network is confirmed. In other embodiments, the WiFi provider computing device 13 may be notified of the request and have the option to accept or reject the rental of the WiFi by the user. Further still, the system may charge a deposit and then track the amount of time on the WiFi network and dynamically create a bill based on a dollar per minute of use rate, wherein the payment instrument is charged once the user logs off the system 10.

Figure 5B:
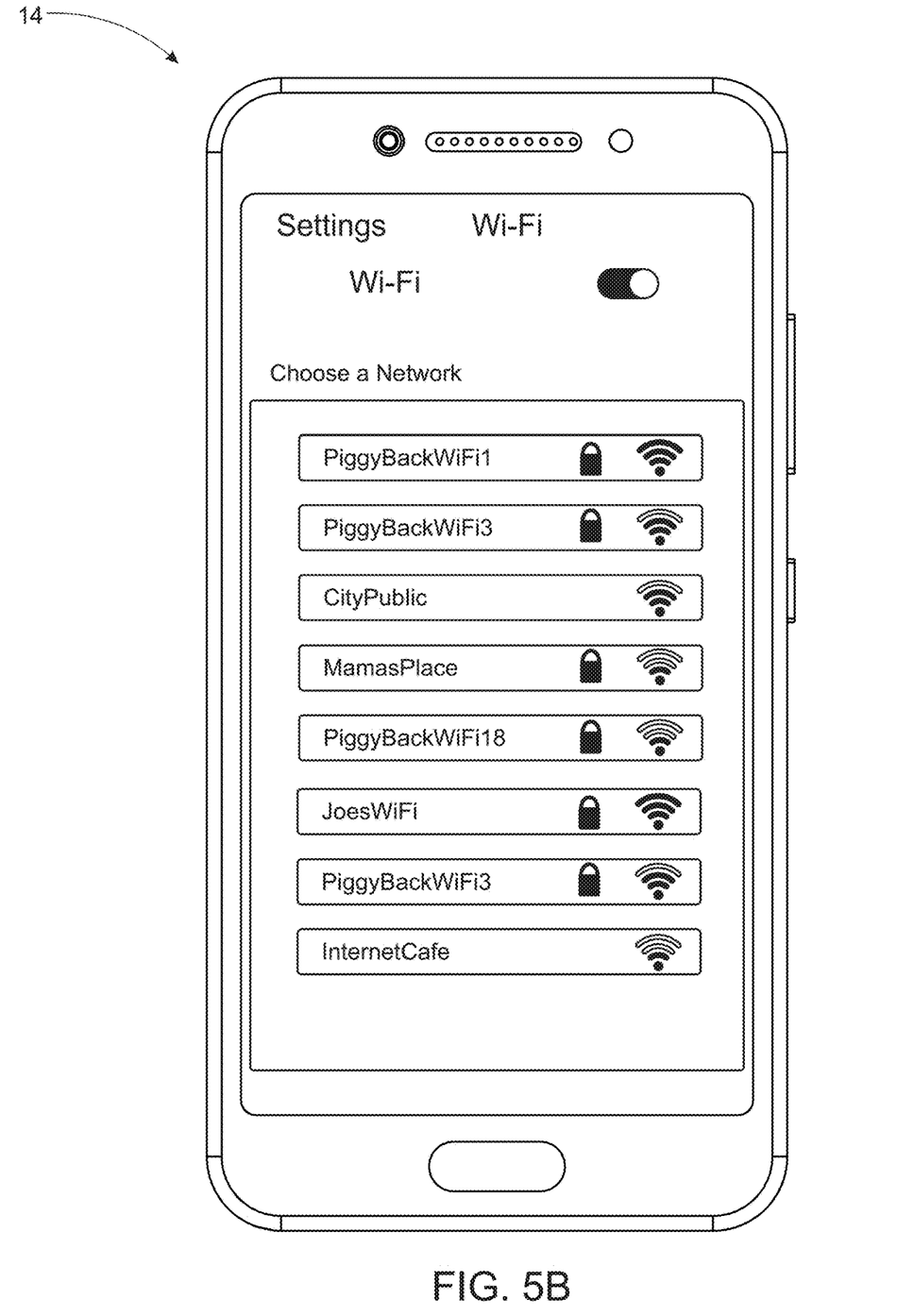
FIG. 5B is a user interface for connecting with a WiFi sharing system for a user that seeks to rent a WiFi signal using native phone Wi-Fi settings according to an embodiment.

FIG. 5B depicts another way for connecting to the system. The user computing device 12 may be utilized to access the device's native Wi-Fi settings, wherein a list of available networks is provided. This list may include shared WiFi signals from the system 10. Once the user selects to connect to a system shared WiFi network, the user is directed to the interface depicted in FIG. 6 and proceeds as described above.

The system or the provider may control usage of the shared WiFi signal. For example, and without limitation, the system either automatically, or by entry of a provider, may establish a threshold of users on a WiFi network, wherein the system does not allow more than a predetermined number of users on a single WiFi network in order to avoid bandwidth issues. Further, the system may require a minimum signal strength in order for a user to access a shared WiFi network.

The WiFi sharing system 10 provides many benefits. These benefits include providing a unique identifiable address to find and login from a user computing device that is not previously connected to the WiFi network. Further, the system 10 provides data collection of time used and/or data used and incorporates a billing process that may be tied to time of use and/or tied to amount of data used. The system 10 may compensate for signal strength, surge demand and flexible pricing by establishing a different rate structure for each of these and other situations.

Use of the system 10 empowers home owners and individuals to make extra money from their WIFI signal, and further allows them to be a part of a sharing economy to utilize unused assets. In doing so, control may be given to the users by allowing them to limit participants on same address to maintain signal strength at a desired threshold. This limit may also be system controlled.

Embodiments may be available on or through the internet, such as through domain names reserved and owned by Applicant that include piggybackwifi.com, 5barswifi.com, wifipls.com, wifi-rent.com, wifipronto.com, wifi4.rent, wifirent.online, piggywifi.com, or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:
1. A Wi-Fi sharing system comprising:
a server having a memory storing personal property information; and
a user computing device coupled to a first provider computing device, wherein the server is programmed to:
receive and process a signal from the first provider computing device, the signal indicating that at least a first Wi-Fi network of a plurality of primary Wi-Fi networks is associated with the first provider computing device and is in a share Wi-Fi mode;
automatically set the first Wi-Fi network of the plurality of primary Wi-Fi networks to share Wi-Fi mode;
receive and process a signal from the user computing device that the user computing device is requesting to rent access to a Wi-Fi network, wherein the request includes location data of the user computing device;
determine that the first Wi-Fi network, in the share Wi-Fi mode, is within Wi-Fi proximity of the user computing device and send name of the first Wi-Fi network to the user computing device for display and selection through the user computing device;
receive and process a signal from the user computing device selecting the first Wi-Fi network;
before the user computing device is connected to the first Wi-Fi network, send for display on the first provider computing device an indication that the first Wi-Fi network has been selected by the user computing device and provide an option for the first Wi-Fi network selection to be accepted or denied through input to the first provider computing device, where-upon the user computing device is automatically connected to the first Wi-Fi network only if the first Wi-Fi network selection is accepted;
process payment for use of the first Wi-Fi network and automatically establish a connection between the user computing device and the first Wi-Fi network without sharing SSID, password or a combination of the SSID and the password; and
transfer the connection from the user computing device to a second Wi-Fi network on the system if the Wi-Fi network signal strength of the first Wi-Fi network drops below a minimum threshold, wherein the payment is apportioned between each provider of the Wi-Fi networks to which the user computing device is connected.

2. The system of claim 1, further comprising security and encryption technology that prevents a user of the user computing device from viewing files of and communications from any other users sharing the first and second Wi-Fi networks.

3. The system of claim 2, wherein the security and encryption technology prevents the user from accessing the provider computing device to set the first Wi-Fi network to share Wi-Fi mode.

4. The system of claim 1, further comprising a provider interface displayed on the provider computing device, wherein the first Wi-Fi network is placed in the share Wi-Fi mode in response to input to the provider interface by a provider using the provider computing device.

5. The system of claim 4, wherein the server is further programmed to:
determine a total number of users accessing the first Wi-Fi network; and
dynamically display the total number of users on the provider computing device in real time.

6. The system of claim 5, wherein the server is further programmed to limit the number of users accessing the first Wi-Fi network at any time in response to provider input to the provider computing device.

7. The system of claim 6, wherein the provider interface comprises an option for the provider to choose between placing the first Wi-Fi network in the share Wi-Fi mode as a shared signal, wherein multiple user computing devices may access the first Wi-Fi network, and as a dedicated signal, wherein only one user computing device may access the first Wi-Fi network.

8. The system of claim 1, wherein the personal property information includes a network ID and password associated with the first Wi-Fi network, wherein the provider interface includes an interface screen comprising Wi-Fi network confirmation settings of the first Wi-Fi network including network ID and password input fields, wherein the server automatically sets the first Wi-Fi network to share Wi-Fi mode only after the provider enters the correct network ID and password associated with the first Wi-Fi network through the provider interface.

9. The system of claim 1, further comprising:
a plurality of provider computing devices coupled to the server, wherein each of the plurality of provider computing devices corresponds to one of the plurality of primary Wi-Fi networks; and
a user interface displayed on the user computing device, wherein the user interface displays a list of the primary Wi-Fi networks, of the plurality of primary Wi-Fi networks, that are within a detectable range of the user computing device and that are in the share Wi-Fi mode for selection by a user of the user computing device.

10. The system of claim 9, wherein the list of primary Wi-Fi networks is accessible through native Wi-Fi settings of the user computing device, wherein the native Wi-Fi settings also displays other Wi-Fi networks that are not coupled to the system.

11. The system of claim 9, wherein the list is sortable by a filter selected from a group of filters consisting of signal strength, provider rating, availability time, shared signal, dedicated signal, and any combination thereof.

12. The system of claim 9, wherein the server is further programmed to:
receive a login signal from the user computing device through a limited connection between the user computing device and the first Wi-Fi network, the login signal bypassing the provider computing device, the login signal including a username and user password;
verify that the username and user password are associated with a user account stored on the server;
confirm that an active payment instrument information is associated with the user account and available to pay for use of the system; and
automatically connect the user computing device to the first Wi-Fi network only after the username and user password are verified and the payment instrument information is confirmed.

13. The system of claim 12, wherein the server is further programmed to:
charge a deposit to the user account;
track usage time of the user computing device on the first Wi-Fi network; and
charge the user account an additional charge based on the amount of time the user computing device is connected to the first Wi-Fi network.

14. The system of claim 13, wherein the additional charge is further based on criteria selected from the group consisting of amount of data used, signal strength, surge demand, rate structure, and any combination thereof.

15. The system of claim 1, wherein the server is further programmed to require a predetermined minimum signal strength of the first Wi-Fi network at the user computing device in order for the user computing device to be connected to the first Wi-Fi network.

* * * * *